US00RE34532E

United States Patent [19]

Luu et al.

[11] E Patent Number: Re. 34,532

[45] Reissued Date of Patent: Feb. 1, 1994

[54] PLUG-IN ELECTRICAL OUTLET

[75] Inventors: Lionel T. V. Luu; Daniel H. V. Luu, both of Carmel, Ind.

[73] Assignee: Pacomax Industries, Inc., Indianapolis, Ind.

[21] Appl. No.: 892,147

[22] Filed: Jun. 2, 1992

Related U.S. Patent Documents

Reissue of:

[64] Patent No.: 4,934,962
Issued: Jun. 19, 1990
Appl. No.: 395,991
Filed: Aug. 21, 1989

[51] Int. Cl.[5] ..... H01R 13/00

[52] U.S. Cl. ..... 439/651

[58] Field of Search ..... 439/650-657

[56] References Cited

U.S. PATENT DOCUMENTS

| | | | |
|---|---|---|---|
| 2,706,255 | 4/1955 | Freeman | 439/651 |
| 3,484,735 | 12/1969 | Fanelli | 439/651 |
| 3,525,971 | 8/1970 | Glassman | 439/651 |

*Primary Examiner*—Joseph H. McGlynn
*Attorney, Agent, or Firm*—Ostrolenk, Faber, Gerb & Soffen

[57] ABSTRACT

This invention relates generally to the electrical plug receptacle units and particularly to multiple electrical receptacle units adapted to be attached to a wall-mounted receptacle.

31 Claims, 2 Drawing Sheets

PLUG-IN ELECTRICAL OUTLET

Matter enclosed in heavy brackets [ ] appears in the original patent but forms no part of this reissue specification; matter printed in italics indicates the additions made by reissue.

BACKGROUND OF THE INVENTION

This invention relates generally to the electrical plug receptacle units and particularly to multiple electrical plug receptacle units adapted to be attached to a wall-mounted receptacle.

In households, offices, and the like, electrical plug receptacles are generally mounted in a wall such that the receptacle is approximately co-planar with the wall. This configuration requires that any electrical plug be inserted in a direction generally perpendicular to the wall. As a result, the plugs, and the cords which are generally integral thereto, occupy a significant amount of space in front of the wall so that furniture, appliances, etc. cannot be placed immediately adjacent to the wall. Further, most wall-mounted electrical receptacles are duplex in form, that is, the receptacle will accommodate only two plugs. On occasion, it may be desirable or necessary for more than two plugs to be coupled to the electrical power at a particular electrical receptacle. In such circumstances, it has been common for plug receptacle adapter devices to be employed. Such adapter devices typically engage one or both electrical outlets of a standard wall-mounted duplex electrical plug receptacle and provide three or more outlets on an outer surface thereby increasing the number of plugs which can obtain power from a single duplex receptacle. The use of such adapters generally contributes to the space problem addressed previously. Further, such adapter units contribute to an unsightly pile of spaghetti like appearance to the various cords attached to the plugs inserted in the receptacle and adapter.

In addition to space and appearance problems, prior art adapters often also have some structural features which contribute to some functional or performance problems. For example, many electrical plug receptacle adapter units employ a single unitary metal element to form a prong of the adapter unit for insertion into the wall-mounted receptacle and the contact blades necessary to contact electrical plugs inserted into the adapter unit. While such unitary construction may have some advantages, it has been observed that upon the insertion of a plug into the receptacle adapter unit, the insertion force is transmitted directly to the blade inserted in the wall-mounted receptacle and can contribute to blade contact failure. The single unitary metal units, if designed to contact both duplex outlets of the wall mounted receptacle, can act to defeat a selectively switched arrangement present in the wall mounted receptacle.

Additionally, in order to lower costs, the electrical contacts within the receptacle adapter unit have typically been situated within an adapter unit solely by means of the insulative material making up the exterior or body of the adapter unit. Construction of such a unit is accomplished by forming cast units which consume a great deal of insulating material. Alternatively, such units can be constructed for piece-wise assembly using a ready formed body, but often such units are susceptible to breakage when experiencing the insertion forces applied during the insertion of electrical plugs into the adapter unit. Additional problems have been observed with prior art electrical receptacle adapter units which, although not enumerated here, are in fact solved by the construction and use of a multiple electrical plug receptacle unit in accordance with the present invention.

SUMMARY OF THE INVENTION

A multiple electrical plug receptacle adapter unit in accordance with the present invention is intended for attachment to a wall-mounted electrical plug receptacle. Such attachment can be accomplished by means of withdrawing the central screw which secures the receptacle cover to the wall-mounted receptacle, inserting the adapter unit of the present invention into the wall-mounted electrical plug receptacle and securing the receptacle adapter unit with the use of a screw passing through the receptacle adapter unit and engaging the same threads from which the cover screw was previously removed.

The receptacle adapter unit itself generally comprises a housing including an outer surface, an inner surface, and a plurality of prong-receiving apertures penetrating the housing, the housing having a perimetral edge defining a wall-facing opening. A back plate is received within the perimetral edge of the housing so as to define a space between the back plate and the housing. The back plate has a plurality of prongs projecting therethrough, the prongs having outer ends adapted for engagement in a wall-mounted receptacle and inner ends situated in the space between the back plate and the housing. A plurality of pods are fixed within the housing adjacent the plurality of apertures penetrating the housing. Each pod encases a plurality of electrically conductive contact strips, each strip being aligned with at least two of the plurality of apertures. A flexible electrical conductor means electrically connects each strip to one of the prong inner ends.

In the preferred embodiment, the housing includes a decorative front panel and side panels extending rearwardly from the front panel to the perimetral edge. The plurality of prong receiving apertures are confined to the side panels so that plugs are inserted into the adapter unit in a direction parallel to the surface of the wall to which the adapter unit is indirectly mounted.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures.

DESCRIPTION OF THE PREFERRED EMBODIMENT

Figure 1:
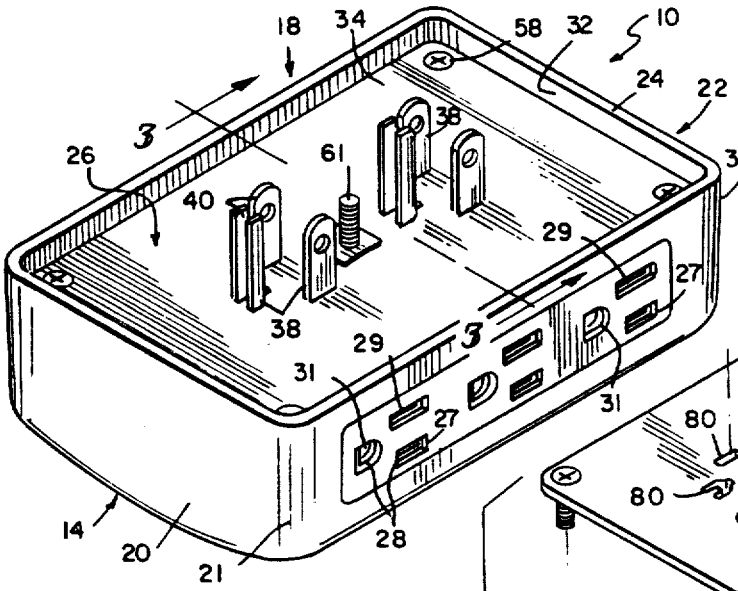
FIG. 1 is a perspective view of the back, a side, and an end of an electrical plug receptacle adapter unit in accordance with the present invention.

An electrical plug receptacle adapter unit 10 in accordance with the present invention is shown in a perspective view in FIG. 1 to include a housing 12 which has a front panel 14, side panels 16 and 18 as well end panels 20 and 22. The side panels 16 and 18 together with the end panels 20 and 22 extend rearwardly from the front panel 14 to a perimetral edge 24 which defines a rearward or wall-facing opening 26. A plurality of apertures 28 for receiving prongs of electrical plugs are situated on both side panels 16 and 18. The front panel 14 does not include any prong receiving apertures 28 and instead can be decoratively configured to present a pleasing appearance. The apertures 28, including live prong opening 27, neutral prong opening 29, and ground prong opening 31, extend between the outer surface 30 and the inner surface 32 of the housing 12.

A back plate 34 is received within the perimetral edge 24 of the housing 12 generally parallel to, but spaced from, the front panel 14. The outer ends 40 of prongs 38 project through the back plate 34 for engagement in a wall receptacle (not shown). Fasteners 58 secure the back plate 34 to the housing 12. A mounting screw 61 projects rearwardly from the center of the receptacle adapter unit 10 to engage the threads of the cover screw mounting [whole] *hole* typically found in a wall-mounted receptacle.

Figure 2:
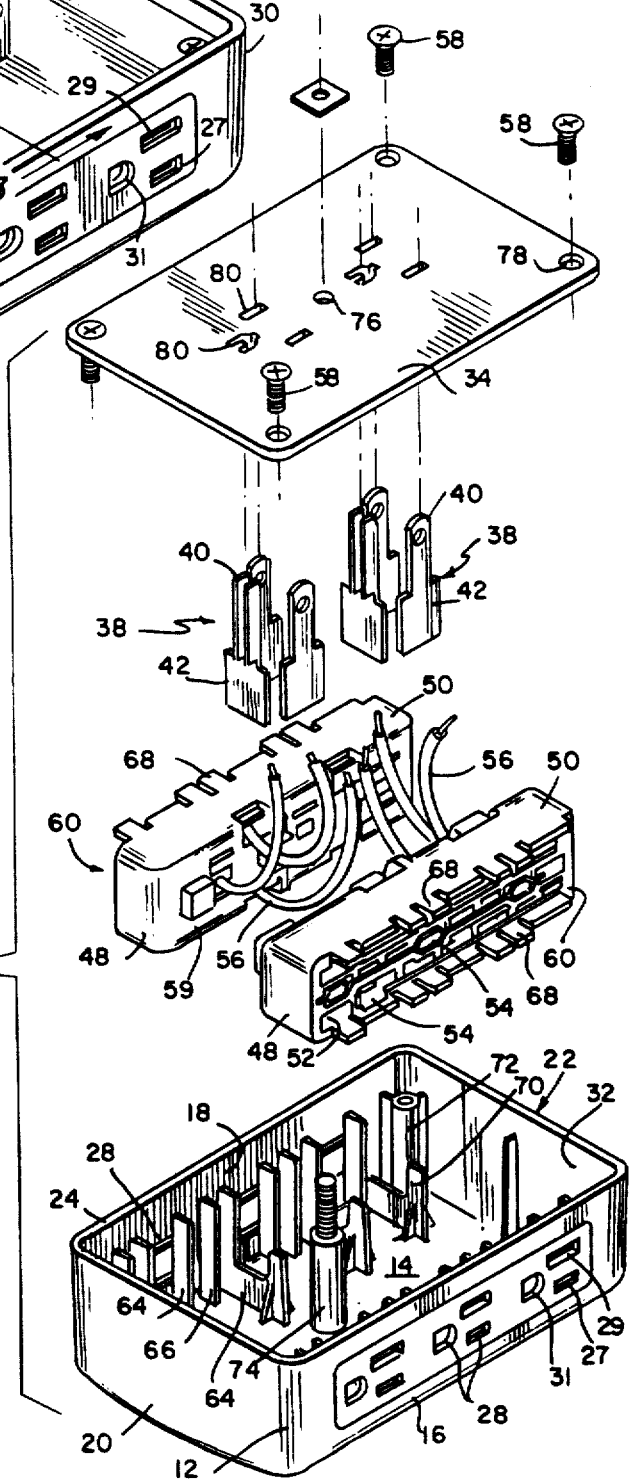
FIG. 2 is an exploded perspective view of the receptacle adapter unit shown in FIG. 1.

As can be seen from FIG. 2, the receptacle adapter unit 10 includes a pair of identical pods 48 which are fixed within the housing 12 adjacent to the plurality of apertures 28 in the sides 16 and 18 of the housing 12. Each pod 48 comprises generally a unitary block 50 of electrically insulative material having a plurality of slots 52 spaced from each other on an outward facing surface 60 thereof. A plurality of contact strips 54 are situated in each pod 48 with only one of the contact strips 54 being received in each of the slots 52. A flexible electrical conductor 56 connects each of the strips 54 to one of the inner ends 42 of prongs 38 so that each pod 48 is independently connected to only one of the duplex receptacles to which the adapter 10 may be inserted.

The housing 12 is shown to include a plurality of webs 64 projecting from the inside of the front panel 14 and side panels 16 and 18 into the space 26. The webs 64 function to position the pods 48 with respect to the prong receiving apertures 28. Linear webs 66 are provided to engage the sides of tabs 68 projecting from the front face 52 of pods 48. J-shaped webs 70 are provided to contact the back and inner side of the pods 48 so as to properly position the pods 48 with respect to the apertures 28.

The housing 12 additionally has fastener receiving standoffs 72 for receiving the fasteners 58 which secure the back plate 34 to the housing 12. Additionally, a centrally situated sleeve 74 is provided for directing screw 60 from the front panel 14 of the housing 12 through a central aperture 76 in back plate 34 toward engagement with a wall-mounted plug receptacle (not shown). The back plate 34 additionally includes aperture 78 for receiving fasteners 58 and apertures 80 for receiving prongs 38.

Figure 4:
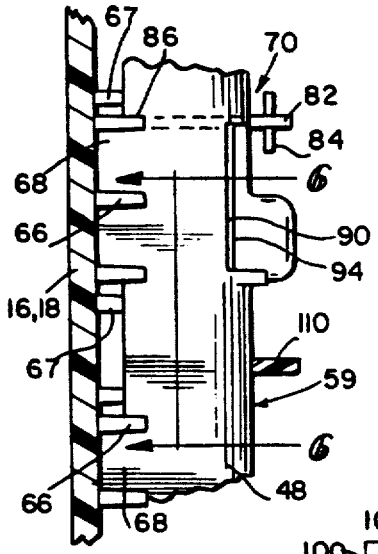
FIG. 4 is a sectional view of the receptacle adapter unit taken along lines 4—4 of FIG. 3.
Figure 3:
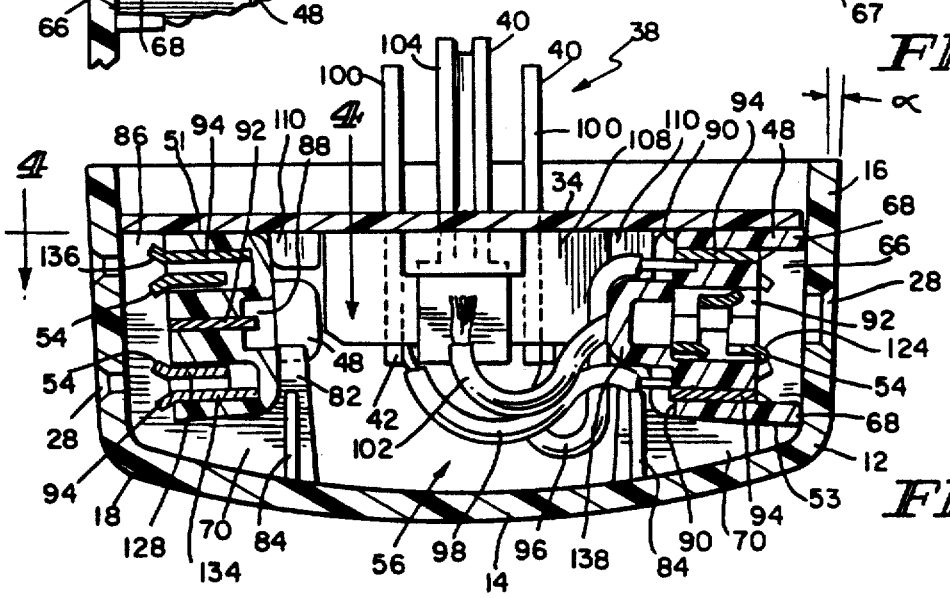
FIG. 3 is a sectional view of the receptacle adapter unit shown in FIG. 1 taken along lines 3—3.

As shown in detail in FIGS. 3 and 4, each of the pods 48 are positioned within housing 12 by means of J-shaped webs 70 which are integral with the front panel 14 of housing 12 as well as one of the side panels 16 or 18. The inner portion 82 of each J-shaped web 64 is shown to include additional sub-webs 84 to provide lateral strength for the inner portion 82. The inner portion 82 contacts the inward-facing surface 59 of pod 48 to provide the pods 48 with enhanced resistance to the insertion force from the insertion of a plug through apertures 28 into engagement with the contact blades 54. Additional webs 110 integral with back plate 34 project toward front panel 14 immediately adjacent to the inward-facing surface 59 [surface] of pods 48 to provide additional reinforcement against said insertion force. The webs 110 and inner portions 82 combine to act on opposite sides of the inward-facing surface 59 of each of the pods 48.

Figure 6:
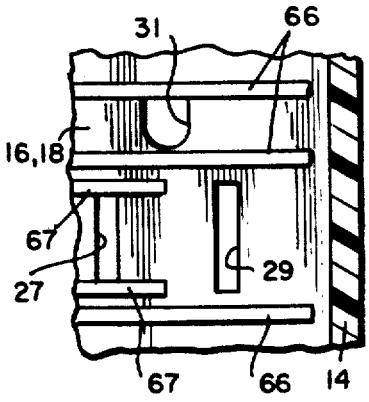
FIG. 6 is a sectional view of the receptacle adapter unit taken along lines 6—6 of FIG. 4.

The sides 16 and 18 of housing 12 are shown in FIG. 3 to diverge outwardly to the rear by a small angle $\alpha$ which is preferably about 2 degrees. The sides 51 and 53 of the pods 48 are similarly divergent by the same angle. The linear webs 66 and lineal portions 86 of J-shaped webs 70 engage the outward facing surface 60 of pods 48 such that the outward facing surfaces 60 is situated parallel to the adjacent side 16 or 18. The linear webs 66 and linear portions 86 of J-shaped webs 70 preferably are bonded to the sides of tabs 68 of pods 48 as shown in FIG. 4. The rearward sides 51 of both pods 48 are contiguous to back plate 34 while the forward sides 53 contact the bight of the J-shaped webs 70. The outward facing surfaces 60 of pods 48 also contact ribs 67 shown in FIGS. 4 and 6. The ribs 67 straddle each live prong opening 27 so as to provide a substantial resistance to any attempted insertion of a neutral prong of a plug.

Each of the pods 48 includes openings 88 and 90 on the inward facing surface of the pods. Opening 88 provides for electrical access to ground contact blade 92, while each of the openings 90 provides for electrical access to powered contact blades 94. The flexible electrical conductors connect the various contact blades 54 to the inner ends 42 of prongs 38 through the openings 88 and 90. In particular, wires 96 and 98 connect the powered contact blades 94 to the inner ends 42 of powered prongs 100 while ground wire 102 connects the ground contact blade 92 to the inner end 42 of ground prong 104, thereby providing a very short electrical path between the various contact blades 54 and the prongs 38. The prongs 38 are positioned independent of the housing 12 by means of webs 106 and 108 which are integral with the back plate 34.

Figure 5:
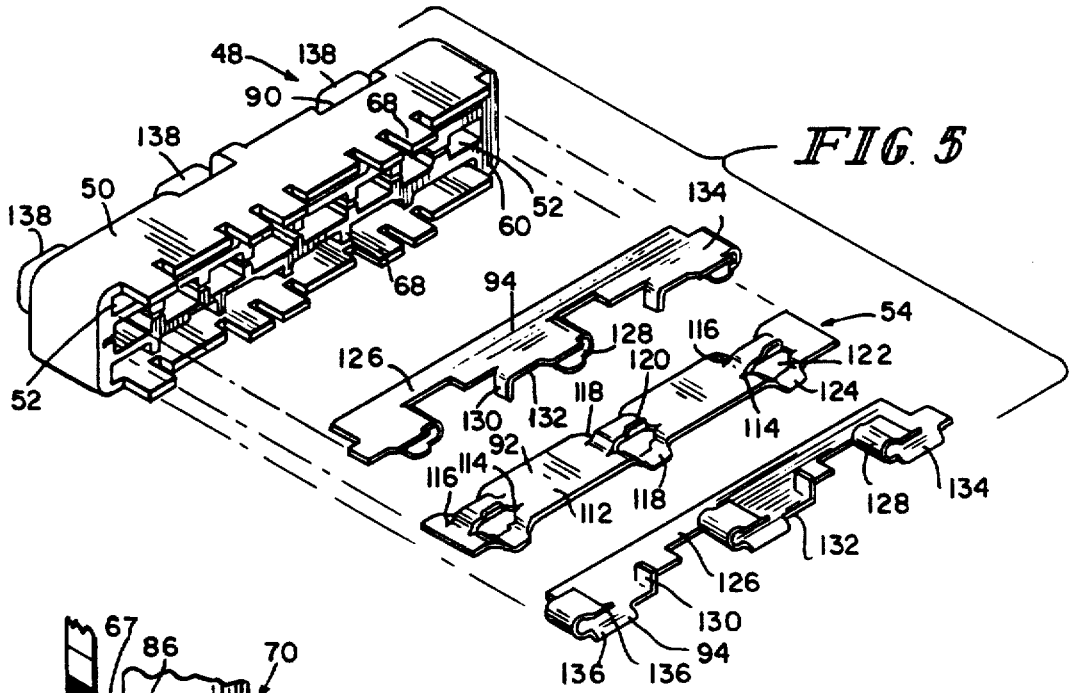
FIG. 5 is an exploded perspective view of a pod taken from a receptacle adapter unit in accordance with the present invention.

As shown in FIGS. 3 and 5, the contact strips 54 are situated such that a pair of powered contact blades 94 straddle the ground contact blade 92 as they are situated within slots 52 in block 50 of pod 48. The ground contact blade 92 is shown to comprise a generally planar bar 112 of electrically conductive material. The bar includes a plurality of pairs of longitudinal slits 114 and 116 which divide the bar 112 into a pair of exterior segments 118 and a central segment 120. The segments 118 and 120 are displaced from the plane of the bar such that segments 118 are found on one side of bar 112 while segments 120 are found on the opposite side of bar 112 thereby forming an opening 122 into which a ground prong can be received. One edge of both segments 118 and 120 include a wing portion 124 angularly positioned with respect to the plane of the bar so as to direct an incoming ground prong between segments 118 and 120.

Both of the powered contact blades are shown to have identical configuration to each other, yet turned to be situated in block 50 opposite to each other. The powered contact blades 94 include a linear bar 126 of electrically conductive material including a plurality of tabs 128 and 130 which are cut from a side 132 of strip 126. Tabs 128 are shown to be bent into a confronting relation to an adjacent portion 134 of the strip 126. Tabs 130 are situated orthogonally with respect to strip 126 and act to longitudinally position the strip 126 within block 50. Each of the confronting portions 134 and tabs 128 include a wing portion 136, similar to wing portions 118 of ground contact blade 92, to direct an incoming powered prong from an inserted plug between portions 128 and 134 of the powered contact blade 94.

Each block 50 is symmetrical about the center of face 60 and includes hollow protrusions 138 which are aligned with openings 122 in the ground contact blade 92 when positioned in block 50. The hollow protrusions 138 have an inside surface 140 as shown in FIG. 3 adapted to receive the distal end of a ground prong inserted through ground prong opening 31. The ground prong opening is straddled by webs 66 while the inside surface 140 of protrusion 138 is preferably tapered to restrict the ground conductor from any sideways movement, thus providing enhanced stability for any plug inserted therein.

The blocks 50 are preferably made of a low cost, strong, fire-retardant material such as a filled phenolic resin. The housing, on the other hand, is preferably made from materials selected for their cosmetic look and structural strength. The difference in choice of materials can contribute to a lowering of overall cost for the receptacle adaptor unit 10. The general configuration of the blocks 50 and the housing 14 including the interior flanges is such that all the parts of the unit can be conveniently molded using simple mold designs. The symmetrical design for the various portions of the adapter unit 10 reduces the required inventory by requiring less different components to assemble a completed apparatus. Additional cost savings is provided by stamp-forming the contact blades 54 such that all the material from which the blades are formed are utilized for a specific purpose in the various portions of the blades. To achieve a balance between cost and material performance, the preferred material for forming the blades 54 is brass having a thickness of about 0.6 mm.

Although the invention has been described in detail with reference to the illustrated preferred embodiment, variations and modifications exist within the scope and spirit of the invention as described and as defined in the following claims.

What is claimed is:

1. A multiple electrical plug receptacle adaptor unit intended for attachment to a wall-mounted electrical plug receptacle comprising:

a housing including an outer surface, an inner surface, a plurality of prong-receiving apertures penetrating the housing, and a perimetral edge defining a wall-facing opening;

a back plate received within the perimetral edge of the housing so as to define a space between the back plate and the housing, the back plate having a plurality of prongs projecting therethrough, the prongs having outer ends adapted for engagement in a wall receptacle, and inner ends situated in the space between the back plate and the housing; and a plurality of pods fixed within the housing adjacent the plurality of apertures, each pod encasing a plurality of contact strips, each strip being aligned with at least two of the plurality of apertures, and flexible means electrically connecting each strip to one of the prong inner ends.

2. The adaptor unit of claim 1 wherein the housing includes a front panel generally parallel to the back plate, and side panels extending rearwardly from the front panel to the perimetral edge, the plurality of prong-receiving apertures being confined to the side panels.

3. The adaptor unit of claim 2 wherein the housing includes a plurality of webs projecting from the front and side panels into said space for positioning the pods with respect to the prong-receiving apertures.

4. The adaptor unit of claim 3 wherein at least some of the plurality of webs comprise a J-shaped web for receiving a pod at a predetermined position with respect to the prong-receiving apertures.

5. The adaptor unit of claim 1 wherein the housing further includes strengthening means adjacent to at least some of the prong-receiving apertures for strengthening the housing to deter incorrect insertion of prongs into the apertures.

6. The adaptor unit of claim 5 wherein the strengthening means comprises a thickened panel section surrounding some of the apertures.

7. The adaptor unit of claim 5 wherein the strengthening means comprises a pair of ribs straddling some of the apertures.

8. The adaptor unit of claim 1 wherein each pod comprises a unitary block of insulative material having a plurality of slots spaced from each other on an outward facing surface, only one of said contact strips being received in each of the slots.

9. The adaptor unit of claim 8 wherein each pod further comprises at least one opening on an inward facing surface of the pod for each contact strip to receive one of said flexible means for electrical connection to an adjacent contact strip.

10. The adaptor unit of claim 9 wherein said flexible means electrically connecting each strip to one of the prong inner ends comprises a wire penetrating the opening on the inward facing surface of the pod to connect each strip to a corresponding prong.

11. The adaptor unit of claim 1 wherein each pod comprises a generally rectangular block of insulative material having a plurality of contact strip-receiving slots on an outward facing surface, and having a plurality of hollow protrusions on an inward facing surface for receiving and stabilizing a ground conductor pin inserted therein.

12. The adaptor unit of claim 1 wherein said plurality of contact strips comprises a pair of powered contact blades straddling a ground contact blade.

13. The adaptor unit of claim 12 wherein each powered contact blade comprises a linear bar of electrically conductive material including a plurality of tabs cut from a side of the bar and bent into a confronting relation to an adjacent portion of the bar.

14. The adaptor unit of claim 13 wherein each of said tabs includes a wing portion angularly positioned with respect to the plane of the bar.

15. The adaptor unit of claim 12 wherein each ground contact blade comprises a generally planar bar of electrically conductive material including a plurality of pairs of longitudinal slits, each pair of slits dividing the bar into a pair of exterior segments and a central segment, the segments being displaced from the plane of the bar.

16. The adaptor unit of claim 15 wherein each of said segments includes a wing portion angularly positioned with respect to the plane of the bar.

17. The adaptor unit of claim 1 further comprising means for attaching the back plate to the housing and means for attaching the plug receptacle to a wall receptacle.

18. A multiple electrical plug receptacle adaptor unit intended for attachment to a wall-mounted electrical plug receptacle comprising:

a housing including a front panel, side panels extending rearwardly from the front panel to a perimetral edge defining a wall-facing opening, a plurality of prong-receiving apertures confined to the side panels and extending between an outer surface and an inner surface thereof;

a back plate received within the perimetral edge of the housing generally parallel to the front panel so as to define a space between the back plate and the housing;

a plurality of prongs projecting through the back plate, the prongs having outer ends adapted for engagement in a wall receptacle, and inner ends situated in the space between the back plate and the housing;

a plurality of pods fixed within the housing adjacent the plurality of apertures, each pod comprising a unitary block of electrically insulative material having a plurality of slots spaced from each other on an outward facing surface thereof;

a plurality of contact strips situated in each pod, each strip being aligned with at least two of the plurality of apertures, only one of the contact strips being received in each of the slots; and flexible means electrically connecting each strip to one of the prong inner ends.

19. The adaptor unit of claim 18 wherein the housing includes a plurality of webs projecting from the front and side panels into said space for positioning the pods with respect to the prong-receiving apertures, at least some of the plurality of webs comprising a J-shaped web for receiving one of the pods at a predetermined position with respect to the prong-receiving apertures.

20. The adaptor unit of claim 18 wherein each pod further comprises at least one opening on an inward facing surface of the pod for each contact strip to receive one of said flexible means for electrical connection to an adjacent contact strip, said flexible means comprising a wire penetrating the opening on the inward facing surface of the pod to connect each strip to a corresponding prong.

21. The adaptor unit of claim 18 wherein said plurality of contact strips comprises a pair of powered contact blades straddling a ground contact blade, each powered contact blade comprising a linear bar of electrically conductive material including a plurality of tabs cut from a side of the bar and bent into a confronting relation to an adjacent portion of the bar, each ground contact blade comprising a generally planar bar of electrically conductive material including a plurality of pairs of longitudinal slits, each pair of slits dividing the bar into a pair of exterior segments and a central segment, the segments being displaced from the plane of the bar.

22. A multiple electrical plug receptacle adaptor unit intended for attachment to a wall-mounted electrical plug receptacle comprising:

a housing including a front panel, side panels extending rearwardly from the front panel to a perimetral edge defining a wall-facing opening, a plurality of prong-receiving apertures confined to the side panels and extending between an outer surface and an inner surface thereof;

a back plate received within the perimetral edge of the housing generally parallel to the front panel so as to define a space between the back plate and the housing;

a plurality of prongs projecting through the back plate, the prongs having outer ends adapted for engagement in a wall receptacle, and inner ends situated in the space between the back plate and the housing;

a plurality of pods fixed within the housing adjacent the plurality of apertures, each pod comprising a unitary block of electrically insulative material having a plurality of slots spaced from each other on an outward facing surface thereof, and having a plurality of hollow protrusions on an inward facing surface for stabilizing a ground conductor pin inserted therein;

a pair of powered contact blades and an intermediate ground contact blade situated in each pod, each blade being aligned with at least two of the plurality of apertures, only one of the contact blades being received in each of the slots; and a wire penetrating the opening on the inward facing surface of the pod electrically connecting each strip to one of the prong inner ends.

23. The adaptor unit of claim 22 wherein each powered contact blade comprises a linear bar of electrically conductive material including a plurality of tabs cut from a side of the bar and bent into a confronting relation to an adjacent portion of the bar, each tab including a wing portion angularly positioned with respect to the plane of the bar.

24. The adaptor unit of claim 22 wherein each ground contact blade comprises a generally planar bar of electrically conductive material including a plurality of pairs of longitudinal slits, each pair of slits dividing the bar into a pair of exterior segments and a central segment, the segments being displaced from the plane of the bar, each of the segments including a wing portion angularly positioned with respect to the plane of the bar.

*25. A multiple electrical plug receptacle adaptor unit intended for attachment to a wall-mounted electrical plug receptacle, comprising:*

*a housing including an outer surface, an inner surface, a plurality of prong-receiving apertures penetrating the housing, and a perimetral edge defining a wall-facing opening;*

*a back plate received within the perimetral edge of the housing so as to define a space between the back plate and the housing, the back plate having a plurality of prongs projecting therethrough, the prongs having outer ends adapted for engagement in a wall receptacle, and inner ends situated in the space between the back plate and the housing; and*

*at least one pod positioned within the housing adjacent the plurality of apertures, the pod encasing a plurality of contact strips, each strip being aligned with at least two of the plurality of apertures, and flexible means electrically connecting each strip to one of the prong inner ends.*

*26. The adaptor unit of claim 25 wherein the housing includes a front panel generally parallel to the back plate, and side panels extending rearwardly from the front panel to the perimetral edge, the plurality of prong-receiving apertures being confined to the side panels.*

*27. The adapter unit of claim 25 wherein each pod comprises a unitary block of insulative material having a plurality of slots spaced from each other on an outward facing surface, only one of said contact strips being received in each of the slots, each pod further comprises at least one opening on an inward facing surface of the pod for each contact strip to receive one of said flexible means for electrical connection to an adjacent contact strip, and said flexible means electrically connecting each strip to one of the prong inner ends comprises a wire penetrating the opening on the inward facing surface of the pod to connect each strip to a corresponding prong.*

*28. The adaptor unit of claim 25 wherein each pod comprises a generally rectangular block of insulative material having a plurality of contact strip-receiving slots on an outward facing surface, and having a plurality of hollow protrusions on an inward facing surface for receiving and stabilizing a ground conductor pin inserted therein.*

*29. The adaptor unit of claim 25 further comprising means for attaching the back plate to the housing and means for attaching the plug receptacle to a wall receptacle.*

*30. The adaptor unit of claim 25 wherein said plurality of contact strips comprises a pair of powered contact blades straddling a ground contact blade.*

*31. The adaptor unit of claim 30 wherein each powered contact blade comprises a linear bar of electrically conductive material including a plurality of tabs cut from a side of the bar and bent into a confronting relation to an adjacent portion of the bar.*

* * * * *